June 28, 1927.
D. E. LEWELLEN
1,634,034
BELT FASTENER
Filed May 3, 1926
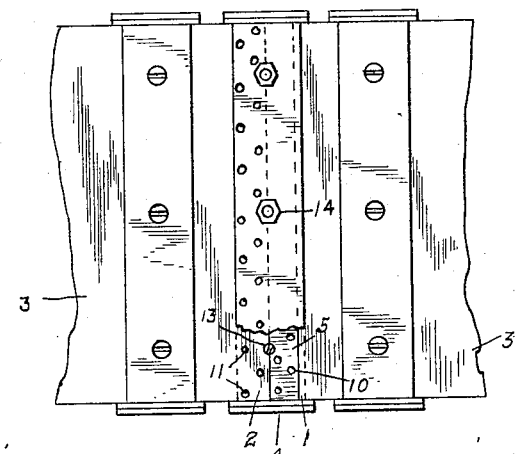
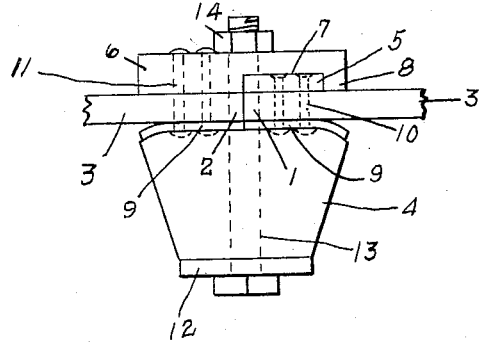
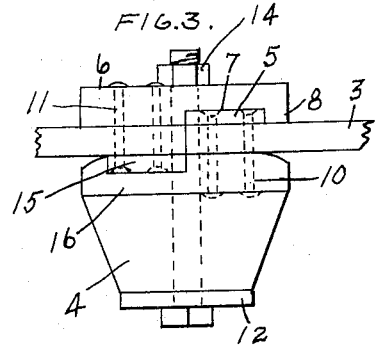
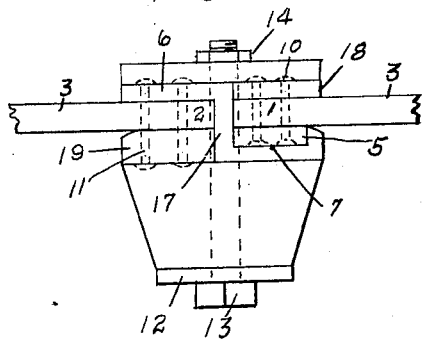
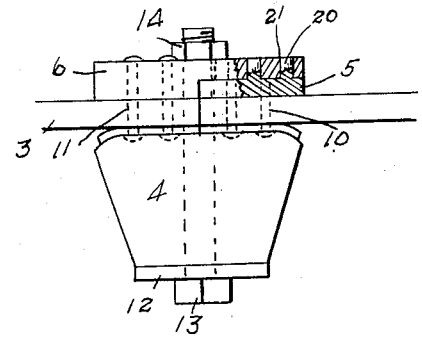
INVENTOR.
DARCY E. LEWELLEN.
BY *Carey S. Frye*
ATTORNEY.

Patented June 28, 1927.

1,634,034

UNITED STATES PATENT OFFICE.

DARCY E. LEWELLEN, OF COLUMBUS, INDIANA.

BELT FASTENER.

Application filed May 3, 1926. Serial No. 106,257.

This invention relates to belt fasteners and is designed primarily for securing the ends of a power belt, such as is employed in connection with variable speed transmission mechanisms, in which a plurality of transverse blocks, having friction pads at their ends, are secured to the belt.

The prime feature of the invention is in so constructing the fastening mechanism that it may be readily manipulated for securing the ends of the belt together, even though the transmission mechanism is positioned at a point difficult of access.

A further feature of the invention is the provision of interlocking parts which, when locked together, form an exceptionally strong union and render the belt continuous.

A further feature of the invention is in so constructing the various interlocking parts of the fastener, that they may all be attached in position on the belt while the belt is removed from the transmission mechanism, so that it is but necessary to interlock and clamp the parts together after the belt has been placed in position on the transmission mechanism.

A further feature of the invention is in so constructing and arranging the interlocking parts that the pull or stress of the belt will be directed solely against the interlocking parts at points to withstand the greatest strain.

A further feature of the invention is the provision of means for causing the belt to make a uniform bend while passing around the transmission disks.

Other objects and advantages will be hereinafter more fully set forth and pointed out in the accompanying specification.

In the accompanying drawing which is made a part of this application,

Figure 1 is a top plan view of a portion of a belt showing the fastening mechanism applied thereto with parts broken away.

Figure 2 is an enlarged, detail end elevation of the fastening mechanism.

Figure 3 is a similar view of a slightly different form of structure.

Figure 4 is a similar view of a further modified structure, and,

Figure 5 is an end elevation, partly in section, of a still different form of structure.

Referring to the drawings, 1 and 2 indicate the abutting ends of a belt 3, which belt is constructed of any suitable material, and when used in connection with a variable speed transmission mechanism, has a series of blocks 4 attached thereto, said blocks being spaced uniform distances apart and preferably extending the full width of the belt.

Heretofore it has been extremely difficult to secure the ends of the belt together, especially when the transmission mechanism was in use, principally due to the crude manner in which the ends of the belt have heretofore been secured together, and the inaccessibility to the ends of the belt.

To overcome these objectionable features, a cleat 5 is attached to the surface of the belt adjacent one of the ends thereof, with which cooperates a clamping member 6, attached to the face of the belt adjacent the opposite end of the belt, the members 5 and 6, in this instance, being connected respectively with the ends 1 and 2 of the belt. The clamping member 6 is so constructed that it overlaps the cleat 5, the inner face of the member 6 having a recess or channel 7 for the reception of the cleat 5, the flange 8, at the edge of the recess 7, overhanging and engaging the side edges of the cleat, thereby directing the pull or stress of the belt against the cleat at a point that will withstand the greatest amount of strain.

On the opposite side of the belt from the members 5 and 6, are inserted plates 9, which parallel the members 5 and 6, one of the plates and the member 5 being fixed to the end 1 of the belt by means of rivets or the like 10, while the opposite plate and the clamping member 6 are attached to the end 2 of the belt by means of rivets or the like 11. Positioned immediately below the plates 9 is one of the blocks 4, the corners of the block and the outer edges of the plates being preferably curved to form rounding surfaces over which the belt may bend as it passes around the disks of the transmission mechanism. The block 4 is preferably reinforced by a metal bar 12.

The members 5 and 6 are held in interlocked relation with each other and the block 4 is held in engagement with the belt, through the medium of bolts 13, said bolts passing outwardly through the block and through the interlocking member and having nuts 14 threaded onto the outer ends thereof.

In Figure 3 of the drawing an additional cleat 15 is attached to the end 2 of the belt with which engages a clamping member 16 interposed between the block 4 and belt 3, the rivets 10 connecting the clamping member 16 with the end 1 of the belt, while the rivets 11 connect the cleat 15 with the end 2 of the belt.

In Figure 4 of the drawing the cleat 5 is attached to the inner face of the end 1 of the belt and the clamping member 6 is formed substantially L-shaped and has a right angular section 17, which projects between the abutting ends 1 and 2 of the belt so as to extend the recess 7 in position to engage with the cleat 5 on the inner face of the belt. In this instance blocks 18 and 19 are placed on opposite sides of the ends of the belt 3 to receive the ends of the rivets 10 and 11, respectively.

In Figure 5 of the drawing, the cleat 5 is provided with a plurality of studs or projections 20, which extend into recesses or openings 21 in that part of the clamping member 6 overlapping the cleat 5, and although the studs are shown extending entirely through the clamping member, the recesses 21 may extend part way therethrough and may be in the nature of oblong recesses, and the studs may be arranged to extend longitudinally of the cleat 5.

It will be understood of course, that the cleats and clamping members may be transposed to the opposite side of the belt without departing from the scope of the invention, and that the cleats and clamping members may be formed in sections instead of in a single piece.

With this form of device the ends of the belt may be quickly and securely fastened together either before or after the transmission mechanism is applied to use, as all of the parts may be easily assembled together, even in a very limited space, and the nuts readily turned onto the bolts for locking the parts together.

What I claim is:

1. In a belt fastener, the combination with a belt, and a belt block associated therewith, of transverse members attached to said belt, one of said members having an extension adapted to span the adjacent member, interlocking means on the extension, for receiving the belt pull and means for locking said parts together.

2. In a belt fastener, the combination with a belt, of two or more transverse members attached to said belt, one or more of said members having a recessed extension adapted to span and interlock with an adjacent member or members, means for directing the pull of the belt against the interlocking parts at the point of greatest resistance, and means for locking said parts together.

3. In a belt fastener, the combination with a belt having abutting ends, and a belt block associated therewith, of transverse members attached to said abutting ends, one of each set of transverse members having a channelled portion adapted to interlock with the other transverse member of the set, and means for locking all of said parts together.

4. In a belt fastener, the combination with a belt having abutting ends and a belt block associated therewith, of a cleat attached to one of said abutting ends, a clamping member attached to the other abutting end, an extension on said clamping member adapted to span and interlock with said cleat and means for locking said parts together.

5. In a belt fastener, the combination with a belt having abutting ends, of a cleat attached to one of said abutting ends, a clamping member attached to the other abutting end, an extension on said clamping member adapted to extend over and interlock with said cleat, and means for locking all of said parts together.

6. In a belt fastener, the combination with a belt having abutting ends, of a cleat attached to one of said abutting ends, a clamping member attached to the opposite abutting end, and an extension on said clamping member adapted to extend over the top face and side edges of said cleat and interlock therewith.

7. In a belt fastener, the combination with a belt having abutting ends, and a belt block associated therewith, of a cleat attached to one of said abutting ends, a clamping member attached to the opposite abutting end, an extension on said clamping member adapted to extend over the top face and side edges of said cleat and interlock therewith, and means for locking all of said parts together.

In testimony whereof I hereto affix my signature.

DARCY E. LEWELLEN.